June 29, 1937.  R. C. POST  2,085,040

SAFETY BRAKING MEANS FOR HOISTING MACHINES

Filed March 29, 1934   3 Sheets-Sheet 1

INVENTOR
ROBERT C. POST
BY
ATTORNEY

June 29, 1937.  R. C. POST  2,085,040
SAFETY BRAKING MEANS FOR HOISTING MACHINES
Filed March 29, 1934   3 Sheets-Sheet 2
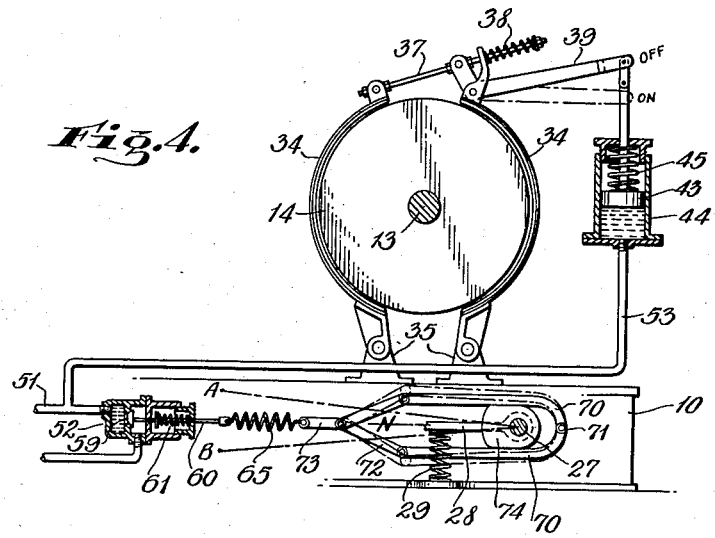
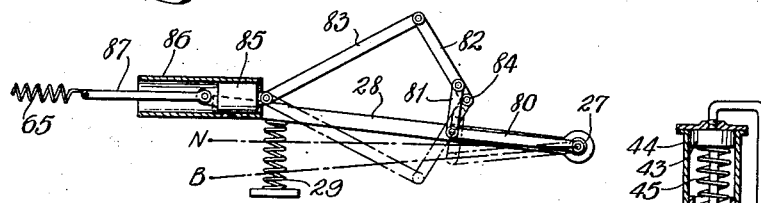
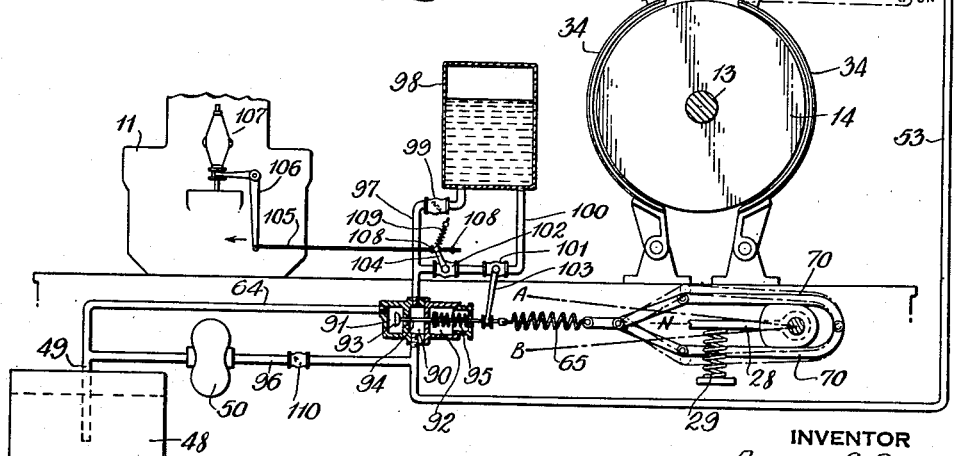
INVENTOR
ROBERT C. POST
BY
ATTORNEY June 29, 1937.  R. C. POST  2,085,040
SAFETY BRAKING MEANS FOR HOISTING MACHINES
Filed March 29, 1934   3 Sheets-Sheet 3
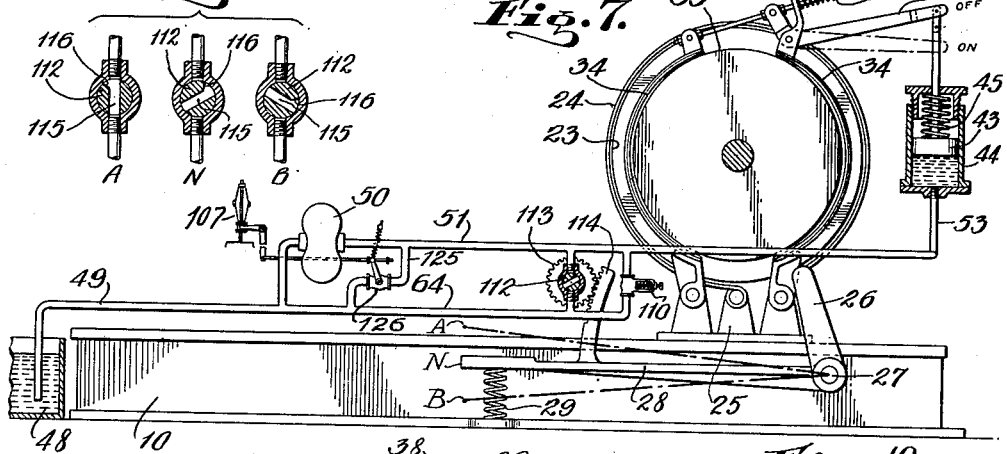
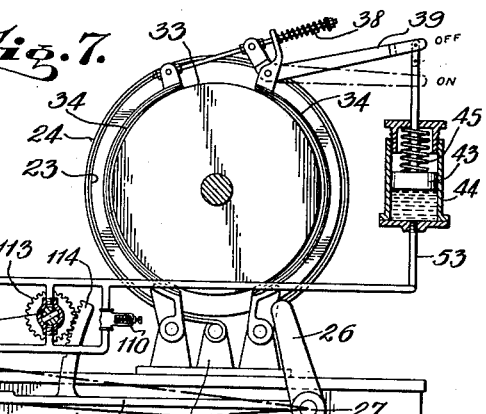
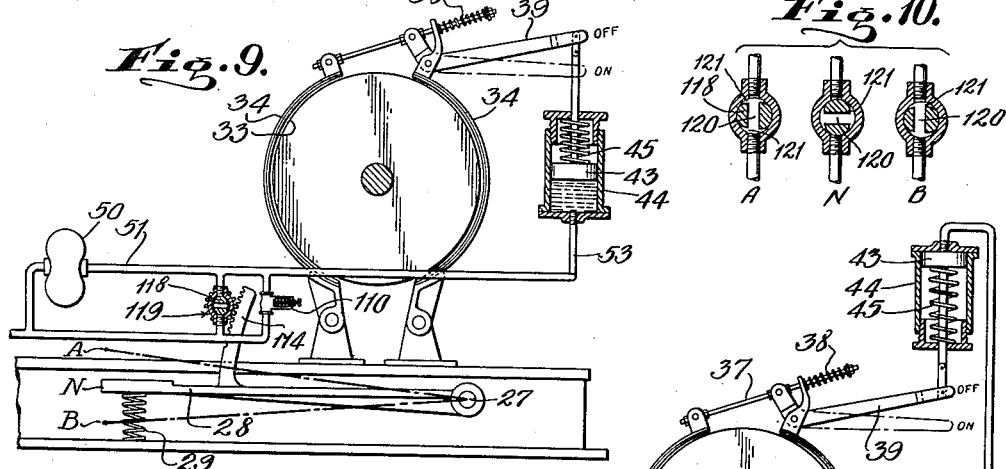
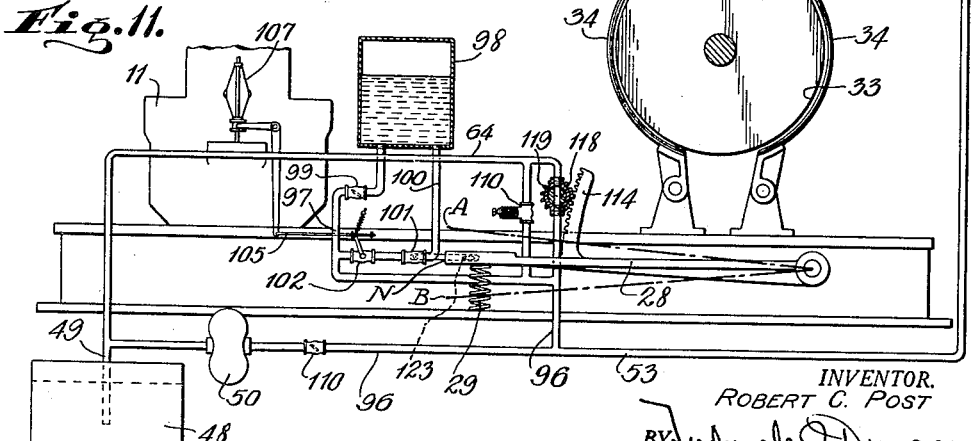
INVENTOR.
ROBERT C. POST
BY Frederick S. Duncan
ATTORNEY.

Patented June 29, 1937

2,085,040

UNITED STATES PATENT OFFICE 2,085,040

SAFETY BRAKING MEANS FOR HOISTING MACHINES

Robert C. Post, Englewood, N. J., assignor to Post & McCord, a corporation of New York Application March 29, 1934, Serial No. 717,885

9 Claims. (Cl. 188—170)

The present invention relates to hoisting machines and has for an object to provide a novel safety braking means therefor.

Such machines usually comprise a cable drum which is turned in hoisting direction by a motor operatively connected to the drum through a clutch. When lowering the load the clutch is disengaged and the load is permitted to descend by gravity under control of a service brake. The load may be held in suspended position by means of a pawl and ratchet whenever desired but during operation of the machine the pawl is swung clear of the ratchet. The service brake is usually operated by a pedal, leaving the operator's hands free for operation of the clutch or for throwing in the ratchet pawl. If when lowering the load the operator should become suddenly stricken and lose control of the brake or if his foot should accidentally slip off the service pedal the load might gain too much momentum to be checked without breaking the hoisting cable or wrecking the machine. Again if when raising the load the power should suddenly fail the load would fall and it might acquire too much momentum to be stopped by the time the operator could take in the situation and apply his service brake.

In my Patent No. 1,922,635, issued August 15, 1933, I disclose a safety brake for hoisting machines which overcomes such dangers. In the specific disclosure in said patent I show an electrically-powered hoisting machine and a safety brake which is normally operative to prevent lowering of the load but is rendered inoperative by electro-magnetic means under control of the pedal operating the service brake. This pedal has to be depressed from normal to a neutral position to throw off the safety brake and thereafter further depression of the pedal controls the service brake. The pedal is arranged to spring back to normal position when it is released thereby breaking the energizing circuit of the electro-magnetic means so that the safety brake is then free immediately to assume its operative position. Thus unless the service brake is under control as a result of depression of the pedal to or past neutral position the safety brake will prevent dropping of the load. If the power should fail while the service pedal was in neutral position the safety brake would immediately act to prevent the load from falling.

The present invention has for an object to provide another form of safety braking means for hoisting machines.

A further object of the present invention is to provide a hydraulically-operated safety braking means instead of the electrically-operated magnetic means so that the safety brake can be used not only on electrically-powered hoisting machines but on machines driven by other forms of power.

In one species of my invention a safety brake is normally maintained in operative position but is released from such position by hydraulic pressure supplied by the motor which drives the hoisting machine, so that if, because of a failure of power or for any other reason, the motor should stop the safety brake would be applied at once.

In another species the brake is normally maintained in applied position by hydraulic pressure from a pressure reservoir and the pressure on the brake is relieved by moving a service pedal to a neutral position.

It is also within the purview of my invention to provide the cable drum of a hoisting machine with a single brake which serves both for safety and for service purposes, said brake being withdrawn from applied position by operating a service pedal.

A further object of the invention is to provide a combined safety and service brake controlled by a service pedal in such manner that the brake will be released by moving the pedal to a neutral position and will be applied by movement of the pedal in either direction from such neutral position.

Other objects will appear in the following description of several embodiments of my invention and thereafter the novelty and scope of the invention will be pointed out in the claims.

In the accompanying drawings;

Fig. 4 is a fragmental and somewhat diagrammatic side elevation, partly in section, of another embodiment of my invention in which a single brake is used for both service and safety purposes;

Fig. 5 is a detail view of an alternative connection between the brake pedal and the brake mechanism;

Fig. 6 is a somewhat diagrammatic view in side elevation and partly in section of still another embodiment of my invention;

Fig. 7 is a somewhat diagrammatic view in side elevation and partly in section showing a double brake machine, such as illustrated in Fig. 1, but with a different form of valve control for the safety brake;

Fig. 8 illustrates different positions of the control valve shown in Fig. 7;

Fig. 9 is a fragmentary diagrammatic view, partly in section, of a single brake machine with a valve control that differs somewhat from that shown in Fig. 7;

Fig. 10 illustrates different positions of the control valve shown in Fig. 9; and Fig. 11 is a somewhat diagrammatic view in side elevation and partly in section of a single brake machine corresponding in general to that shown in Fig. 6 but with a different form of valve control for the brake.

Figure 1:
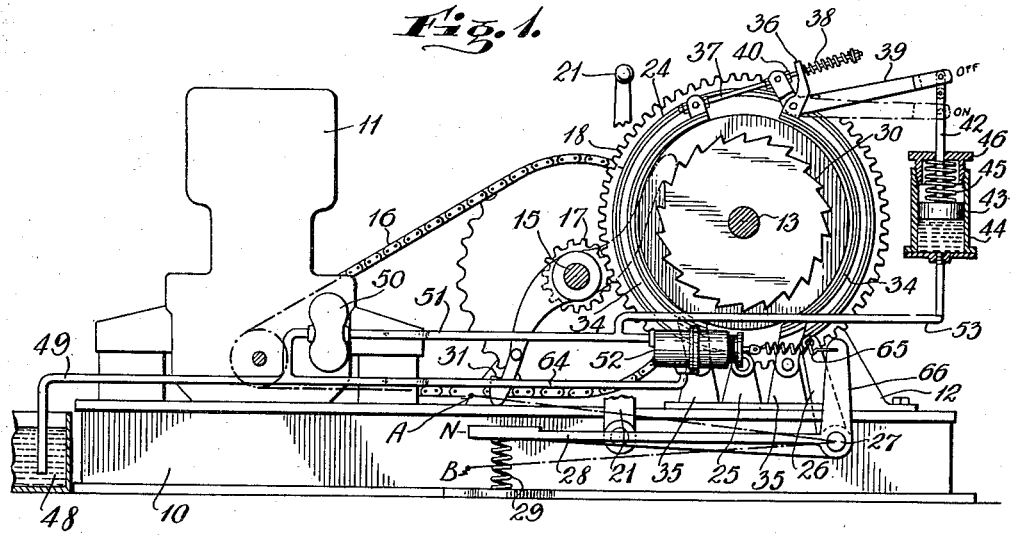
Figure 1 is a front elevation partly in section of a single-drum hoisting machine embodying my invention.
Figure 2:
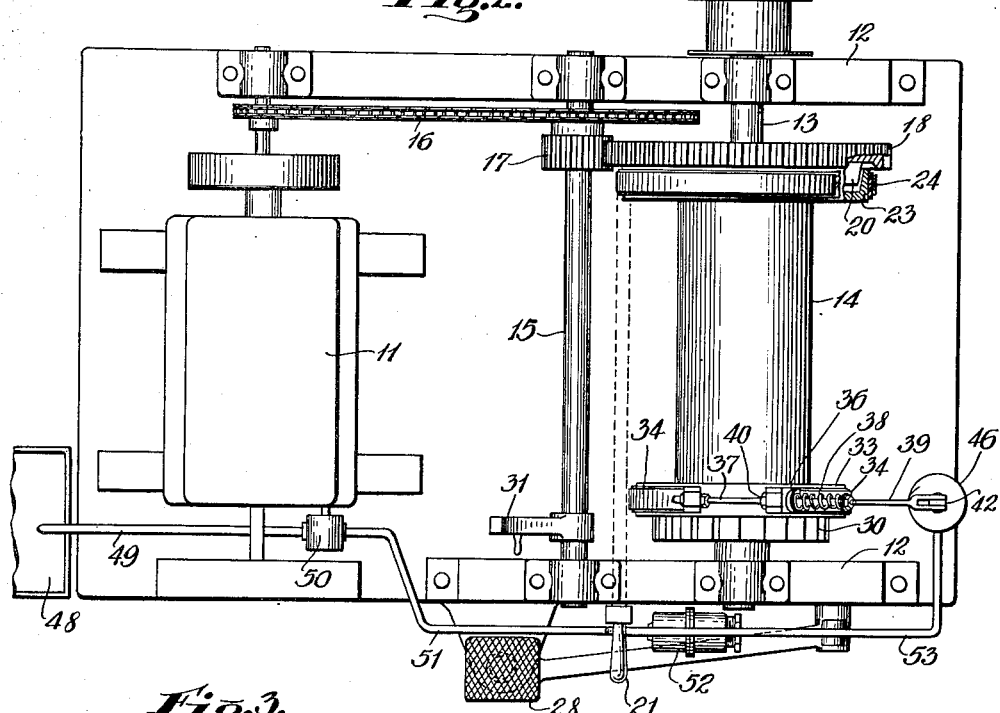
Fig. 2 is a top plan view of the same.

The hoisting machine illustrated in Figs. 1 and 2 comprises a base 10 on which is mounted an internal combustion motor 11. The base is provided with a pair of brackets 12 disposed respectively at the front and at the rear thereof which brackets provide bearings for a shaft 13 on which is mounted a cable drum 14. In Fig. 1 the bracket 12 on the forward side of the machine has been removed. Another shaft 15 is also mounted to rotate in bearings in the brackets 12. The latter shaft is driven by the motor through a chain belt drive 16, and a pinion 17 fixed on this shaft meshes with a gear wheel 18 keyed or splined upon the shaft 13.

The drum 14 is operatively connected to the shaft 13 through a friction clutch 20. This clutch may be of any standard form and consequently is not shown in detail. The clutch is normally spring-pressed to disengaged position but may be moved into engaging position by operation of a clutch lever 21. This clutch lever has to be held in engaging position as long as the hoisting drum is to be driven by power.

The hoisting drum is formed with a brake flange 23 which is engaged by a brake band 24 anchored at one end to a bracket 25 on the base. The other end of the band is secured to an arm 26 fixed upon a shaft 27. The latter passes through and is journaled in the base 10. Secured to a projecting end of this shaft is a pedal lever 28 which is normally urged to the position indicated by the broken line A by means of a spring 29. In Fig. 1 the pedal is shown in neutral position N, in which position the brake band is disengaged from the drum flange but further movement of the pedal from the position N to that indicated by the broken line B will apply the brake band to the drum flange with increasing friction so as to arrest the descent of a load carried by the cable wound upon the hoisting drum 20.

At the forward end of the drum there is a ratchet wheel 30 fixed thereto which is adapted to be engaged by a pawl 31. The latter is pivoted upon the shaft 15 and during operation the pawl is swung clear of the ratchet wheel. When, however, it is desired to hold a load at a certain level the pawl may be thrown to the position shown in broken lines in Fig. 1 to engage a tooth of the ratchet wheel.

I have provided in addition to the service brake, a safety brake which comprises a brake flange 33 formed on the drum and a pair of brake shoes 34 pivoted at their lower ends to brackets 35 rising from the base 10. The free end of one of the brake shoes carries a bracket 36 through which passes a rod 37 pivotally connected to the free end of the other brake shoe. A spring 38 on this rod bears against the bracket 36 and tends to draw the brake shoes into braking engagement with the flange 33 so that normally the brake is operative to prevent rotation of the hoisting drum. Pivotally mounted in the bracket 36 is a bell crank 39, one arm of which is operatively connected to a collar 40 fixed upon the rod 37. The other arm of the bell crank is connected by a link to the stem 42 of a plunger 43 which is fitted to slide in a cylinder 44. A spring 45 surrounding the stem 42 is compressed between the plunger and an adjustable cap 46 threaded into the upper end of the cylinder. This spring assists the spring 38 in drawing the brake shoes into braking position. The spring 45 might be dispensed with and in such case the spring 38 would be relied upon as the sole means of drawing the brake shoes into braking position. However, the auxiliary spring 45 provides a convenient means of adjusting the spring pressure acting on the brake shoes.

The safety brake is released by introducing hydraulic pressure in the cylinder 44 to force the plunger upward against the pressure of springs 45 and 38. The bell crank 39 then tends to force the free ends of the shoes apart. The hydraulic system comprises a reservoir 48 for a supply of operating liquid. From this reservoir a suction line 49 leads to a pump 50 driven by the motor 11. This pump is preferably of the rotary gear type. From the pump a pressure header 51 leads to a pressure control device 52 and a branch line 53 from the pressure header leads to the cylinder 44.

Figure 3:
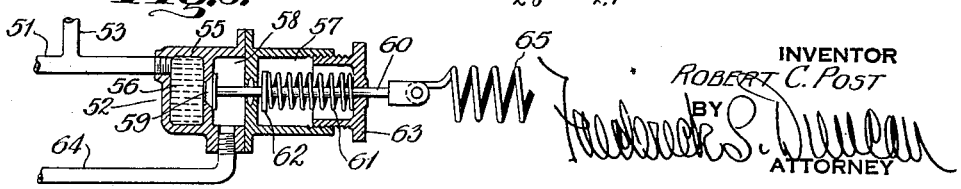
Fig. 3 is a detail view in longitudinal section of a pressure control device employed in my safety brake mechanism.

The pressure control device, as shown in Fig. 3, comprises a casing 55 formed with a pressure chamber 56 at one end, a spring chamber 57 at the other end and an intermediate exhaust chamber 58. Communication between the pressure chamber and the exhaust chamber is controlled by a valve 59. The latter has a stem 60 which passes through the spring chamber. The spring 61 in the spring chamber bears at one end against a collar 62 fixed upon the stem and at the other end against a cap 63 threaded into the outer end of the spring chamber. From the exhaust chamber a return pipe line 64 leads to the suction line 49. The pressure header 51 communicates with the pressure chamber 56. Thus when the pump 50 is operated the pressure developed in the pressure header and consequently in the cylinder 44 will depend upon the pressure of the spring 61, and this pressure may be controlled by the setting of the cap 63. The outer end of the stem 60 is connected by a spring 65 to an arm 66 fixed with the pedal 28 fixed upon shaft 27.

The operation of the hoisting machine will now be explained. Normally the spring 29 raises the pedal 28 to the position shown by the broken line A and hence the arm 66 acting through the spring 65 pulls the valve 59 away from its seat, thereby causing the pressure in the pressure header to fall and permitting the plunger 43 to drop and let the springs 38 and 45 move and hold the brake shoes in operative position. The safety brake is thus normally on, whether the motor is running or not. When the motor is started the safety brake continues to maintain its braking position because the pump operates idly to circulate liquid through the pressure and return lines without developing pressure sufficient to raise the brake operating plunger 43. When it is desired to operate the hoisting machine, either to turn the drum by power or to turn it by gravity pull of the load, the operator must depress the pedal to the neutral position N, as shown in full lines in Fig. 1. When the pedal is thus depressed the valve 59 is free to spring back into closing position under impulse of spring 61 and the pump then builds up sufficient pressure in the pressure header to raise the plunger 43 and release the safety brake. The operator may then throw the clutch lever 21 to connect the drum to power or if he is lowering the load he permits the clutch 20 to remain disengaged and controls the lowering of the load by his service brake. This control is effected by operation of the pedal between the neutral position N and the position B, the extent of depression of the pedal determining the amount of friction exerted by the service brake. During such movement the spring 65 will yield as it is compressed by the swing of arm 66 to the left, as viewed in Fig. 1. If, for any reason, the operator's foot should accidentally slip off the pedal it would immediately spring up to the position A under impulse of spring 29 and would open the communication between pressure chamber 56 and exhaust chamber 58, relieving the cylinder 44 of pressure so that the safety brake would be applied. Again if the power should fail or the motor should stop the pressure in the cylinder 44 would drop because the pump 50 is of a type which will not maintain pressure when it is not running.

Fig. 4 illustrates somewhat diagrammatically a portion of a hoisting machine in which the cable drum is provided with a single brake serving both for safety purposes and for service purposes. Corresponding parts in this figure and in Figs. 1 and 2 are given the same reference numerals. It will be observed that the cable drum 14 is provided with a brake which is identical in form with the safety brake shown in Fig. 1 and is operated by similar hydraulic means. The difference between the two forms consists in the connection between the control device 52 and the brake pedal 28.

Two arms 70 are pivoted at 71 on the base 10 of the machine. These arms are connected at their forward ends by links 72 to a common link 73 which connects them to the spring 65 of the control device. The shaft 27 to which the service pedal 28 is affixed passes between the arms 70, and a cam 74 secured to the shaft bears against the arms 70 in such manner that when the pedal 28 is moved in either direction from its neutral position shown by full lines in Fig. 4 one or the other of the arms 70 will be swung on its pivot 71 so as to exert a pull on the link 73 and hence on the valve 59.

Normally the pedal 28 is raised by the spring 29 to the position indicated by the broken line A in which position the valve 59 will be withdrawn from its seat, thereby releasing the pressure in the header 51 and permitting the brake to be drawn to the "on-position" by action of springs 38 and 45. When the operator steps upon the service pedal so that the brake is under his control, he may gradually release the brake by gradually depressing the pedal from the safety position A to the neutral position N, and the braking effect will be inversely proportional to the depression of the pedal. However, since operators are trained to apply a brake by pressure on a pedal rather than by release of the pedal, it is preferable to operate the pedal between the position N and the position B when controlling the lowering of the load.

It will thus be seen that I have provided a single brake which serves not only for safety purposes but also for service purposes and that said brake will be applied by movement of the pedal in either direction from the neutral position. When the pedal is in the neutral position the spring 61 closes the valve 59 and then liquid under pressure is supplied to the cylinder 44 to raise the plunger 43 and throw the brake to the "off-position" shown in full lines in Fig. 4. In this construction no compressive force is applied to the valve stem in moving the pedal from the N position to the B position, but the spring 65 is useful in permitting the valve 59 to yield and prevent the building up of a dangerous pressure when the pedal is held in neutral position.

Instead of the double arm structure shown in Fig. 4, a toggle link motion may be employed, such as shown in Fig. 5. In this case, the pedal shaft 27 carries an arm 80 which is linked by a member 81 to one of a pair of toggle links 82 and 83. The toggle link 82 to which the member 81 is connected is provided with a fixed pivot 84 while the other toggle link 82 is pivotally connected to a block 85 which slides in a suitable guide 86. A link 87 conects the block 85 to the spring 65.

In Fig. 5, the service pedal 28 is shown in its A position having been raised to this position by the spring 29. The toggle links 82 and 84 have pulled the block 85 so as to withdraw the valve 59 from its seat. Consequently, there is no pressure in the cylinder 44 and the brake is in the applied position. When the pedal is depressed to the neutral position N, the toggle links are swung into mutual alinement, thereby sliding the block 85 toward the left, as shown in Fig. 5, and forcing the valve 59 to closed position. Thereupon pressure is built up in the header 51 and line 53, raising the plunger 43 and releasing the brake. Further depression of the pedal from the N position toward the B position tends to open the valve 59 and the pressure in the cylinder 44 will be reduced to an extent determined by the extent of opening of said valve, thereby controlling the extent of application of the brake under pressure of springs 38 and 45.

As in the construction shown in Fig. 4 a graded application of the brake may be obtained by a corresponding release of pressure on the pedal 28 but preferably in service the brake is controlled by applying pressure to the pedal to move it from the N position toward the B position rather than by relieving the pressure to permit the pedal to move under the pressure of spring 29 from the N position toward the A position. It will be observed that in either of the constructions shown in Figs. 4 and 5 respectively, the brake is normally in applied position and must be actuated by hydraulic pressure to withdraw it to "off-position". Since this pressure is applied by a pump driven by the motor 11, stoppage of the motor would immediately result in the application of the brake. Also, if for any reason the operator should remove his foot from the pedal 28, the latter would immediately swing up to the safety position A under pressure of spring 29 and this would automatically apply the brake.

In the constructions so far described the safety brake is applied by spring pressure and is released by hydraulic pressure. Fig. 6 shows a construction in which these conditions are reversed. The brake is applied by hydraulic pressure and is released by spring pressure as the hydraulic pressure is relieved. In this figure, parts which correspond to those shown in Figs.

1, 2 and 4 are given the same reference numerals.

The bell-crank 39 which operates the brake is connected to a hydraulic operating mechanism which is exactly like that shown in Figs. 1 and 4 except that it is inverted. In other words, the pressure feed line 53 enters the top of the cylinder 44 and fluid supplied through said pipe tends to force the plunger 43 downward against the action of spring 45 to move the brake shoes to "on" position. The spring 38 might be dispensed with, but if used the spring 45 must be strong enough to overpower spring 38.

The pressure controller is also reversed so that it has a pressure chamber 90 intermediate between an exhaust chamber 91 and spring chamber 92. Communication between chambers 90 and 91 is controlled by a valve 93 whose stem 94 passes through the pressure chamber 90 and spring chamber 92. An adjustable spring 95 in the chamber 92 tends to unseat the valve 93. This valve stem is connected through a spring 65 to the cam actuated links 70 exactly as shown in Fig. 4. In the position shown in Fig. 6 the pedal is depressed to neutral position and the spring 95 has unseated the valve 93, but when the pedal occupies either the position A or the position B the valve 93 is seated under pressure of pedal spring 29.

The pump 50 draws liquid from the reservoir 48 and feeds it into the chamber 90 through a pressure header 96. The exhaust chamber 91 is connected by a pipe 64 to the suction line 49 of the pump. Also leading out of the pressure chamber 90, is a pipe 97 which leads into a pressure reservoir 98. In the pipe 97 there is a check valve 99 which opens toward the reservoir. Leading from the reservoir to the pipe 97 and by-passing the check valve 99 is another pipe 100 provided with two valves 101 and 102. The valve 101 has an operating arm 103 which is operatively connected with the stem 94 in such manner that as the valve 93 is opened the valve 101 is closed. The valve 102 is provided with an operating arm 104 which has a lost motion connection with a rod 105 extending to one arm of a bell-crank 106, the other arm of which is operatively connected to a governor 107 on the motor 11. The valve arm 104 has free play between stops 108 on the rod 105, but a pivoted spring arm 109 forces the valve arm 104 to swing past center against one or the other of said stops.

The operation of this mechanism will now be explained. When the motor is running its governor 107 pulls the rod 105 and closes the valve 102. Variation of speed of the motor does not affect the valve 102 because of the play between the stops 108, but when the motor stops the governor forces the arm 104 past center to the right, as viewed in Fig. 6, and the spring member 109 then forces the valve to wide open position. The drawing shows the motor running, with the valve 102 closed. The pump 50 is operating and causing a circulation of fluid through pressure chamber 90 and thence past the open valve 93 into the exhaust chamber 91. Because the valve 93 is open the spring 45 forces the plunger 43 upward. Consequently the brake is drawn to "off" position by the spring 45. With the pedal in the neutral position illustrated the valve 101, by reason of its connection with the stem 94, is closed but the operation of this valve plays no part in the operation of the brake so long as the motor is running and the valve 102 is closed. When the pedal 28 is released it springs up to the A position, closing valve 93, and then hydraulic pressure is built up in the feed line by the pump 50, so that the plunger 43 is positively depressed and the brake is applied. Surplus liquid is then forced into reservoir 98 past the check valve 99 so as to maintain pressure in said reservoir. When the pedal is moved from the N position to the B position the same result takes place as in movement to the A position. In other words, the valve 93 is closed permitting pressure to be built up in the feed line to cause application of the brake, the extent of such application depending upon the extent of closure of the valve 93. If, for any reason, the motor 11 should stop the valve 102 would open. Unless the pedal was in neutral position the valve 93 would be partly or fully closed and the valve 101 would be correspondingly opened, so that liquid under pressure would then flow by way of pipe 100 into the pressure chamber 90 and thence by way of pipe 53 to the brake cylinder 44, applying the brake. In the pressure header 96 there is a check valve 110 which opens toward the pressure chamber and which would prevent loss of pressure when the pedal is in A or B position and the pump is not running.

It will be obvious that the toggle link connection shown in Fig. 5 may be substituted for the cam 74 and arms 70 in the hydraulically applied brake. The construction shown in Fig. 6 may be used in a hoisting machine having a separate service brake in which case the valve stem would be connected through spring 65 to arm 66 as shown in Fig. 1.

In Fig. 7 I show a machine which like that illustrated in Fig. 1 has a service brake 24 as well as a safety brake 34, but a different control is provided for the latter brake. Like parts in the two figures are indicated by the same reference numerals. It will be seen that the structure shown in Fig. 7 differs from that shown in Fig. 1 in having two valves connected in parallel between the pressure header 51 and the return line 64. One of these valves 110 is in the nature of a safety device, being a spring-pressed relief valve adjustable to limit maximum pressure in the header 51. The other valve 112 when in the normal open position drops the pressure in said header to substantially zero, permitting the springs 38 and 45 to apply the safety brake.

I have shown the valve 112 as an ordinary stop cock whose rotary plug member bears a pinion 113 adapted to be engaged by a rack 114 fixed to the operating pedal 28. This rack and pinion gearing provides such a ratio of moment of the valve with respect to the pedal 28 that when said pedal is in the positions A, N and B in Fig. 7, the valve will occupy the positions shown at A, N and B, respectively, in Fig. 8. Thus, when the pedal is in the normal position A, to which position it is urged by the spring 29 the valve will be open and there will be substantially no pressure in the header 51 and the extension 53 leading to the cylinder 54, and consequently the safety brake will be "on". When the pedal is depressed to the neutral position N the valve will be closed permitting pressure to build up in the header to raise the plunger 43 and release the safety brake. It is desirable to keep the safety brake on until the pedal reaches the neutral position N and consequently the transverse bore 115 in the valve plug is flared as shown at 116 in Fig. 8 so that the valve is not entirely closed until the N position is reached. Between the N and B positions of the pedal, that is, while applying the service brake 24, the valve 112 remains closed, as indicated in Fig. 8, so that the entire braking is effected by the service brake. The pressure relief valve 10 merely prevents development of excessive or dangerous pressures in the pressure header and cylinder 44.

Fig. 9 shows a similar valve control for a hoisting machine having a single brake serving both as a safety brake and as a service brake. A somewhat different form of control valve is used which is shown at 118 in Fig. 9 and the pinion 119 fixed to the rotary plug member of valve 118 is of smaller diameter than the pinion 113 of Fig. 7, so that the plug member turns through 180 degrees in moving from the A to the B position. As shown in Fig. 10, the transverse bore 120 of the plug member has metering grooves 121 extending circumferentially from each end thereof, the purpose of these grooves is to give a graduated opening and closing of the valve.

In operation, when the pedal is in the normal A position, the bore 120 is vertical and the valve is wide open, as shown at A in Fig. 10, so that there is practically no pressure in the header 51 and the brake is applied by the springs 38 and 45. As the pedal is depressed to the N position, the valve is moved to the position shown at N in Fig. 10, but, during such movement there is a gradual closing of the valve so that the pressure in the header 51 is gradually built up and the brake is gradually released. In moving the pedal to the B position, the bore 120 is again brought to vertical position but because of the metering grooves 121 the pressure in the header 51 is gradually reduced and consequently the brake is gradually applied. Because of the metering grooves it is possible to control the pressure of the brake 34 on the drum 33.

Obviously, a metering valve 118 with suitable gearing could be used in the apparatus shown in Fig. 7, if desired, so that the safety brake could be applied with the service brake in moving the pedal from the N position to the B position.

Fig. 11 covers a construction similar in general to that shown in Fig. 6 wherein the safety brake is applied by hydraulic pressure and is released by spring pressure. Like parts in the two figures are given the same reference numerals. It will be observed that the pressure header 96 is connected to the return line 64 through a pair of valves which are connected in parallel. One of these valves is an adjustable pressure relief valve 110 like that shown in Fig. 9, and the other valve is a metering valve 118 like that shown in Figs. 9 and 10. However, the pinion 119 fixed to the plug member of this valve is disposed at 90 degrees to that shown in Fig. 9, so that the valve is wide open when the pedal 28 is in the N position and is completely closed when the pedal is in the A or the B position. Since the valve is of the metering type there is a graduated control of pressure conditions in the header 96 as the valve is moved in either direction to or from the N position. The valve 101 which controls the discharge of fluid under pressure from the reservoir 98 to the cylinder 44 has a pin-and-slot connection 123 to the pedal 28 so that it is closed when the pedal is in the N position but is open when the pedal is in the A position or the B position.

The operation of this apparatus is similar to that of the apparatus shown in Fig. 6. Normally when the pedal 28 is in the A position, the valve 118 is closed and, if the pump 50 is running, fluid under pressure will be fed to the cylinder 44, forcing the plunger 43 downward and applying the brake 34. As the pedal is depressed to the N position the valve 118 is gradually opened, relieving the hydraulic pressure on the plunger 43 and permitting the spring 45 to overpower spring 38 and release the brake 34. In the meantime, while the pump 50 is running fluid will be forced under pressure through the line 97 past the check valve 99 into the pressure reservoir 98. The pump 50 will run as long as the motor 11 is running, but should the latter be stalled for any reason there would be no loss of pressure in the header 96 because of the check valve 110. The discharge line 100 leading out of the pressure reservoir 98 to the pipe 97 is fitted with the two valves 101 and 102. The valve 102 is controlled by the governor 107 of the motor 11, so that it remains closed as long as the motor is running. When the motor stops, however, valve 102 opens and then pressure is supplied from the reservoir 98 to the cylinder 44. This pressure will be controlled by the pedal 28 because when this pedal is in normal A position the valve 101 will be open connecting the cylinder 44 with the pressure reservoir 98. It will be noted that in the A position the valve 118 is closed so that there will be no loss of pressure in the header 96 or the extension thereof 53. As the pedal is moved to the N position the valve 101 closes and cuts off the pressure reservoir but at the same time the valve 118 opens to relieve the pressure in cylinder 44 and permit the spring 45 to apply the brake. As the pedal is moved from the N to the B position the valve 118 again closes and the valve 101 opens. It will be possible with this arrangement, as with that shown in Fig. 6, to control operation of the lowering of a load for a limited time even after the motor 11 stops.

Referring again to the structures in which spring pressure is employed to apply the safety brake and fluid pressure is employed to throw the brake off, when the engine is running, it will be noted that (as so far described) should the engine stop while the pedal was in neutral position the fluid in cylinder 44 would have to be forced back through the pump 50 before the safety brake would be applied. In some cases this might result in disaster if the pump offered considerable resistance to the passage of fluid therethrough in reverse direction, because before the operator realized that the engine had stopped, the load might drop and gain such headway that it would be impossible to check it. To overcome this difficulty means may be provided for by-passing the pump when the engine stops. Such a means is illustrated in Fig. 7. A pipe 125 extends from the pressure header 51 to the discharge line 64, by-passing the pump 50. A valve 126 in this pipe is operatively connected to the governor 107 or to any other suitable part of the engine, so that as long as the engine is running the valve will remain closed, but when the engine stops the valve will open, permitting practically instant application of the safety brake. It will be understood that this by-pass may also be applied as shown to the structure illustrated in Figs. 1, 4 and 9, such by-pass consisting of the by-pass line 125 and the valve 126 operated by suitable connections to the governor 107, as explained above, so that when the engine stops there will be a practically instant application of the safety brake.

While I have described several embodiments of my invention I wish it to be understood that these are to be taken as illustrative and not limitative and that I reserve the right to make changes in form, construction and mode of operation without departing from the spirit and scope of my invention as pointed out in the following claims.

I claim:

1. In a hoisting machine, the combination with a hoisting drum and a power unit for rotating the same, of a friction brake for the drum, a spring holding the brake in normal applied position, means operable by hydraulic pressure to overpower the spring and release the brake, means driven by said unit for developing said pressure, and means for varying said pressure including a controller adapted when in neutral position to permit the application of maximum pressure and upon movement in either direction from said neutral position to reduce said pressure and thereby control the degree of application of the brake.

2. In a hoisting machine, the combinaton of a hoisting drum, and means for rotating the same, a friction brake for the drum normally in operative position to prevent rotation of the drum, and a controller for said brake, said controller when in neutral position releasing said brake and upon movement in either direction from said neutral position applying said brake to a degree proportional to the movement of the controller from said neutral position.

3. In a hoisting machine, the combination with a hoisting drum and a power unit for rotating the same, of a safety brake normally preventing rotation of the drum, means for applying and holding the brake in normal position and opposing means for releasing the brake, one of said two means being actuated by power from said unit, a service brake for the drum normally in released position, an operating lever for applying the service brake, and a control connection between said lever and said opposing means to release the safety brake before the service brake is applied.

4. In a hoisting machine, the combination with a hoisting drum and a power unit for rotating the same, of a service brake, means for operating the service brake to control and arrest rotation of the drum, a safety friction brake normally preventing rotation of the drum, means actuable by power from said unit for releasing the safety brake, and a controller for said two means operable to cause release of the safety brake when the service brake is applied and vice versa.

5. In a hoisting machine, the combination with a hoisting drum, of a service brake and a safety friction brake for the drum, the latter normally preventing rotation of the drum, hydraulic pressure means for releasing the safety brake, a controller for operating the service brake, and means actuated by said controller for controlling the application of the hydraulic pressure to release the safety brake before the service brake is applied.

6. In a hoisting machine, the combination with a hoisting drum and a power unit for rotating the same, of a service brake and a safety friction brake for the drum, the latter normally preventing rotation of the drum, hydraulic pressure means for releasing the safety brake, means driven by said unit for generating said pressure and including a pressure controller, a pedal, means operatively connecting the pedal to the pressure controller, and means operatively connecting the pedal to the service brake, said two connecting means being so related that depression of the pedal will initially cause release of the safety brake and subsequently cause application of the service brake.

7. In a hoisting machine, the combination with a hoisting drum and a power unit for rotating the same, of a friction brake for the drum, a spring holding the brake in normal applied position, means operable by hydraulic pressure to overpower the spring and release the brake, means driven by said unit for developing said pressure, means for varying said pressure at will, and means controlled by said power unit for releasing said pressure as soon as the power unit stops.

8. In a hoisting machine, the combination with a hoisting drum of braking means normally arresting rotation of the drum, control means for the braking means including an actuating pedal movable from a normal position to a neutral position to effect graduated release of the braking means and movable past the neutral position to reapply the braking means.

9. In a hoisting machine, the combination with a hoisting drum and a power unit for rotating the same, of a friction brake normally preventing rotation of the drum, means for applying and holding the brake in normal position, means for releasing the brake, one of said means being actuable by hydraulic pressure, means driven by said unit for generating said pressure, means for varying said pressure at will to control the degree of application of the brake, and a valve directly controlled by the power unit for controlling the hydraulic pressure.

ROBERT C. POST.